United States Patent
Lin

(10) Patent No.: US 11,846,313 B2
(45) Date of Patent: Dec. 19, 2023

(54) TAMPER RESISTANT SYSTEM, TAMPER RESISTANT ASSEMBLY AND DETACHING TOOL

(71) Applicant: QISDA CORPORATION, Taoyuan (TW)

(72) Inventor: Chih-Ying Lin, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 569 days.

(21) Appl. No.: 17/113,129

(22) Filed: Dec. 7, 2020

(65) Prior Publication Data
US 2021/0199151 A1 Jul. 1, 2021

(30) Foreign Application Priority Data
Dec. 31, 2019 (CN) .......................... 201911408332.2

(51) Int. Cl.
*F16B 41/00* (2006.01)
*F16B 39/22* (2006.01)

(52) U.S. Cl.
CPC ............ *F16B 41/005* (2013.01); *F16B 39/22* (2013.01)

(58) Field of Classification Search
CPC ...... F16B 41/005; F16B 39/22; F16B 35/044; F16B 37/044; B25B 23/10
USPC .................... 411/316–318; 81/451–455, 457
See application file for complete search history.

(56) References Cited

U.S. PATENT DOCUMENTS

| | | | | |
|---|---|---|---|---|
| 1,628,740 A * | 5/1927 | Raleigh | ................ | B62D 43/007 411/946 |
| 1,687,788 A * | 10/1928 | Pinkus | .................. | B25B 23/101 81/453 |
| 2,163,134 A * | 6/1939 | Semion | ................. | F16B 5/0208 411/929 |
| 2,684,698 A * | 7/1954 | Shaff | ....................... | B25B 23/10 81/453 |
| 2,952,285 A * | 9/1960 | Roosli | ................... | B25B 23/101 81/453 |
| 3,034,386 A * | 5/1962 | Corlett | .................. | B25B 13/485 411/910 |
| 6,415,693 B1 * | 7/2002 | Simon | ................ | A61B 17/8891 81/453 |
| 6,497,166 B1 * | 12/2002 | Fleckenstein | ......... | B25B 23/101 81/453 |

(Continued)

FOREIGN PATENT DOCUMENTS

| CN | 101109406 A | 1/2008 |
|---|---|---|
| CN | 201714815 U | 1/2011 |

*Primary Examiner* — Flemming Saether

(57) ABSTRACT

A tamper resistant assembly applied to a tamper resistant system includes a tamper resistant screw, a housing, a lock member, a nut and a cover. The tamper resistant screw includes a head, a thread, a groove and a tip. The lock member is disposed in the housing. The lock member includes a plurality of locking blocks, wherein a deformable opening is formed between the locking blocks. The nut is disposed in the housing and covers the deformable opening. The cover is disposed in the housing. The nut is located between the lock member and the cover. When the tip of the tamper resistant screw passes through the cover and the nut sequentially and enters the deformable opening, the nut is separated from the deformable opening and the locking blocks engage with the groove. Furthermore, a detaching tool is provided to detach the tamper resistant assembly.

22 Claims, 18 Drawing Sheets

(56) References Cited

U.S. PATENT DOCUMENTS

2008/0041196 A1* 2/2008 Companioni ......... B25B 23/101
                                                                                      81/453

* cited by examiner

TAMPER RESISTANT SYSTEM, TAMPER RESISTANT ASSEMBLY AND DETACHING TOOL

BACKGROUND OF THE INVENTION

1. Field of the Invention

The invention relates to a tamper resistant system, a tamper resistant assembly and a detaching tool and, more particularly, to a tamper resistant assembly difficult to be detached, a tamper resistant system equipped with the tamper resistant assembly, and a detaching tool configured to detach the tamper resistant assembly.

2. Description of the Prior Art

Lots of electronic devices use a tamper resistant screw to prevent unauthorized disassembly. For example, if a user disassembles a device by an inappropriate manner for purpose of maintenance and the user cannot assemble the device appropriately, some safety issues (e.g. short circuit, fire, and so on) may occur as the device is being used later or the warranty of the device may be terminated.

At present, a shape of a head of a conventional tamper resistant screw, which corresponds to a shape of a driver, is changed from a standard shape (e.g. Phillips, slotted or hexagonal) to a special shape (e.g. triangular, pentagonal, and so on). However, for an unauthorized but professional person, he/she may find or manufacture a corresponding driver to detach the screw after seeing the shape of the screw head if he/she is willing to spend more time and cost.

SUMMARY OF THE INVENTION

An objective of the invention is to provide a tamper resistant system, a tamper resistant assembly and a detaching tool, so as to solve the aforesaid problems.

According to an embodiment of the invention, a tamper resistant system comprises a casing, a frame and a tamper resistant assembly. The frame is disposed with respect to the casing. The tamper resistant assembly comprises a tamper resistant screw, a housing, a lock member, a nut and a cover. The tamper resistant screw comprises a head, a thread, a groove and a tip, wherein the thread is located between the head portion and the groove, and the groove is located between the thread and the tip. The housing is fixed on the frame. The lock member is disposed in the housing. The lock member comprises a plurality of locking blocks, wherein a deformable opening is formed between the locking blocks. The nut is disposed in the housing and covers the deformable opening. The cover is disposed in the housing and abuts against the frame. The nut is located between the lock member and the cover. When the tip of the tamper resistant screw passes through the casing, the frame, the cover and the nut sequentially and enters the deformable opening, the nut is separated from the deformable opening and the locking blocks engage with the groove.

According to another embodiment of the invention, a tamper resistant assembly comprises a tamper resistant screw, a housing, a lock member, a nut and a cover. The tamper resistant screw comprises a head, a thread, a groove and a tip, wherein the thread is located between the head portion and the groove, and the groove is located between the thread and the tip. The housing is fixed on the frame. The lock member is disposed in the housing. The lock member comprises a plurality of locking blocks, wherein a deformable opening is formed between the locking blocks. The nut is disposed in the housing and covers the deformable opening. The cover is disposed in the housing. The nut is located between the lock member and the cover. When the tip of the tamper resistant screw passes through the cover and the nut sequentially and enters the deformable opening, the nut is separated from the deformable opening and the locking blocks engage with the groove.

According to another embodiment of the invention, a detaching tool comprises a driver, a clamping member, a fixing member, a sleeve, an operating member, a first elastic member and a second elastic member. The clamping member is disposed on the driver and the clamping member comprises a plurality of movable hooks. The fixing member fixes the clamping member on the driver. The sleeve is disposed on the clamping member. The operating member is disposed on the clamping member and the sleeve. The operating member has a partition portion and a restraining portion, wherein the partition portion divides an interior of the operating member into a first space and a second space, the sleeve is located in the first space, and the restraining portion restrains a moving range of the sleeve. The first elastic member is disposed on the clamping member and located in the first space. Opposite ends of the first elastic member abut against the partition portion and the sleeve. The second elastic member is disposed on the clamping member and located in the second space. Opposite ends of the second elastic member abut against the partition portion and the fixing member. When the operating member is pulled towards the fixing member, the operating member drives the sleeve to move away from the movable hooks, such that the movable hooks open and the second elastic member is compressed. When the operating member is released, an elastic force generated by the second elastic member drives the operating member and the sleeve to move towards the movable hooks, such that the movable hooks close.

As mentioned in the above, the tamper resistant assembly of the invention implements a tamper resistant function by the cooperation between the tamper resistant screw, the lock member, the cover and the nut. After the tamper resistant assembly is assembled, the tamper resistant screw cannot be detached by a common driver and it can be detached only by the detaching tool of the invention. In other words, if a person does not get the detaching tool of the invention, he/she cannot detach the casing equipped with the tamper resistant assembly of the invention.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
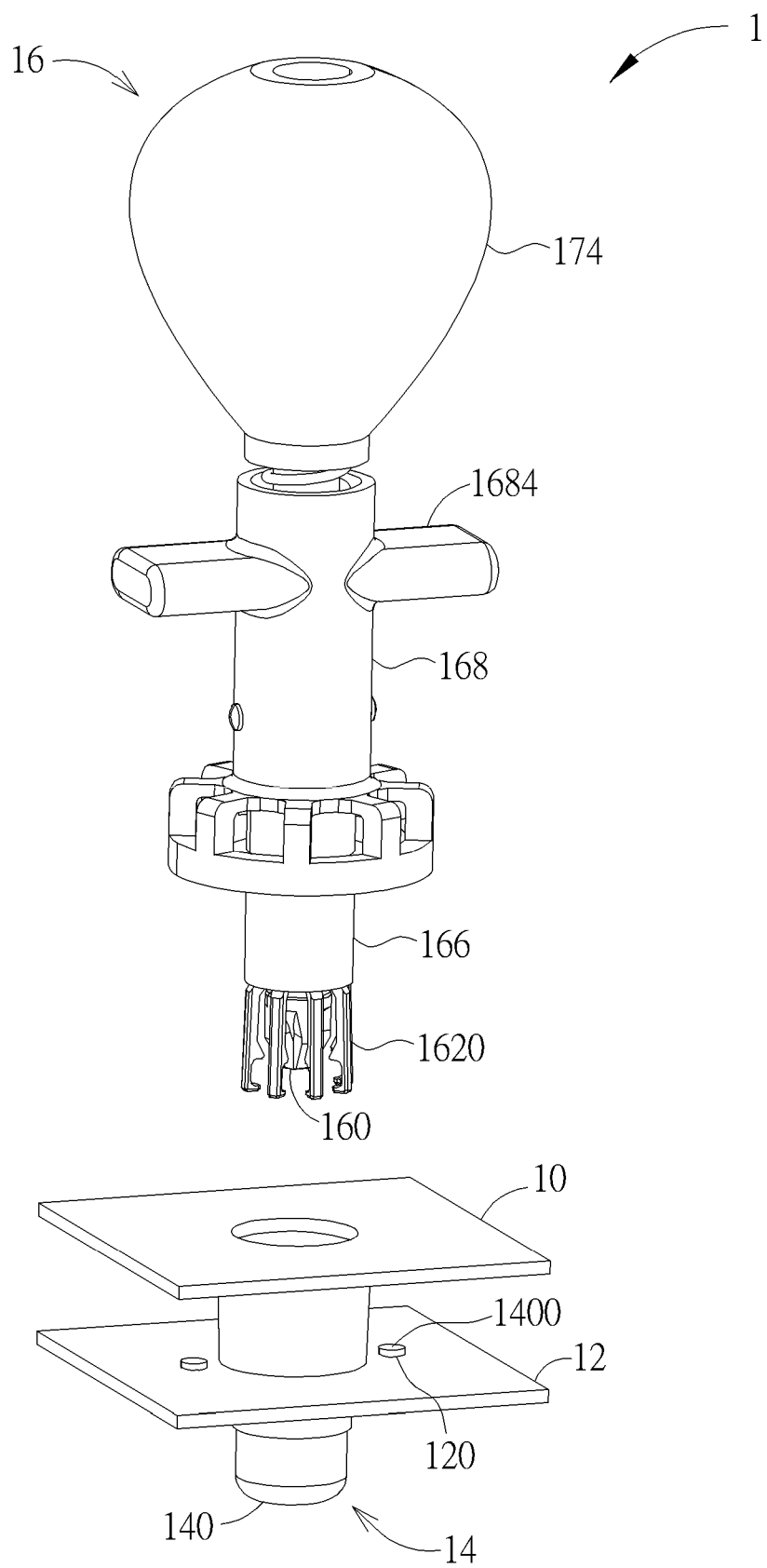
FIG. 1 is a perspective view illustrating a tamper resistant system according to an embodiment of the invention.
Figure 2:
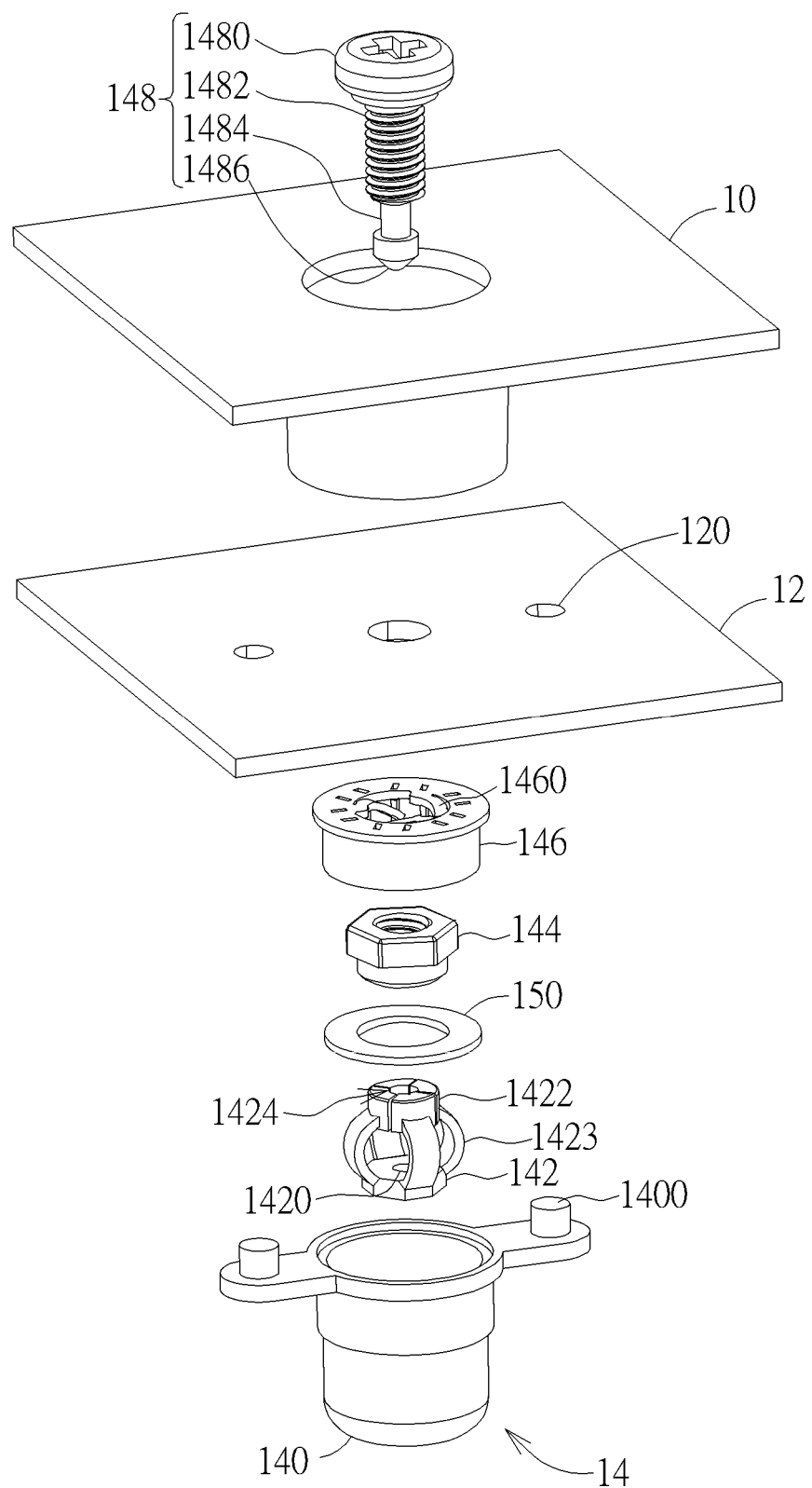
FIG. 2 is an exploded view illustrating the casing, the frame and the tamper resistant assembly.
Figure 3:
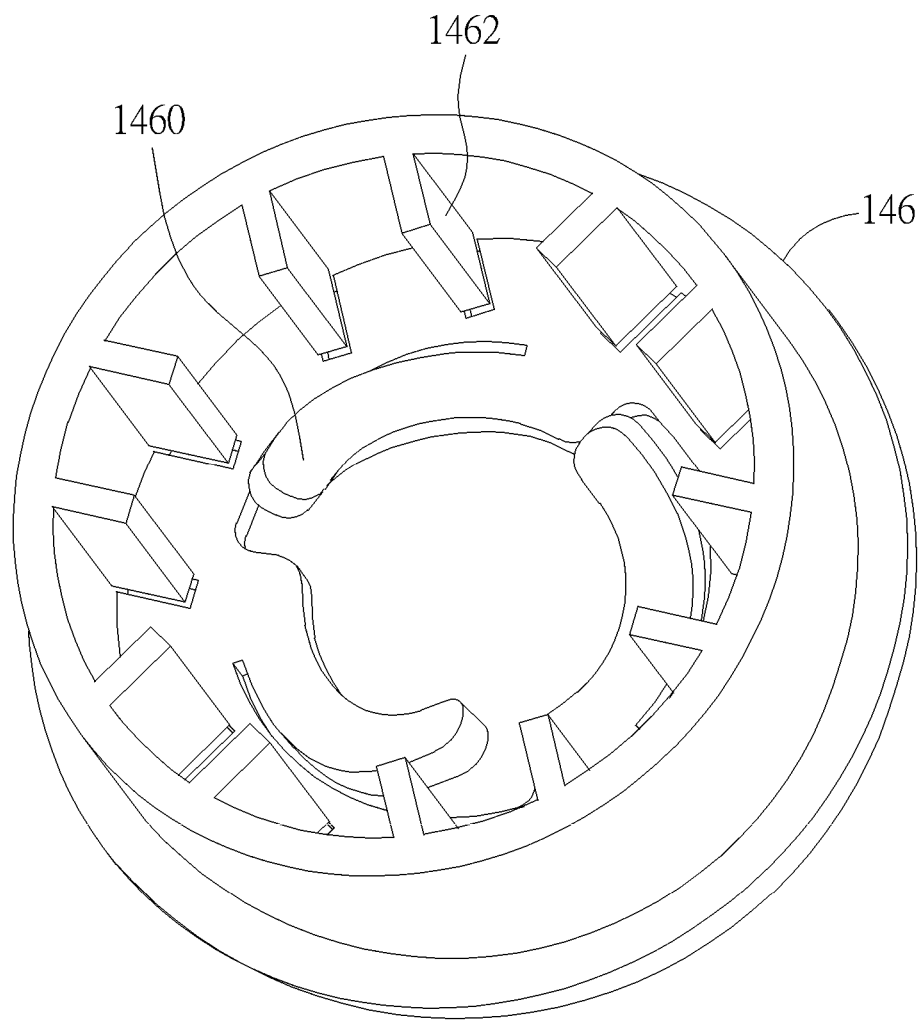
FIG. 3 is a perspective view illustrating the cover from another viewing angle.
Figure 4:
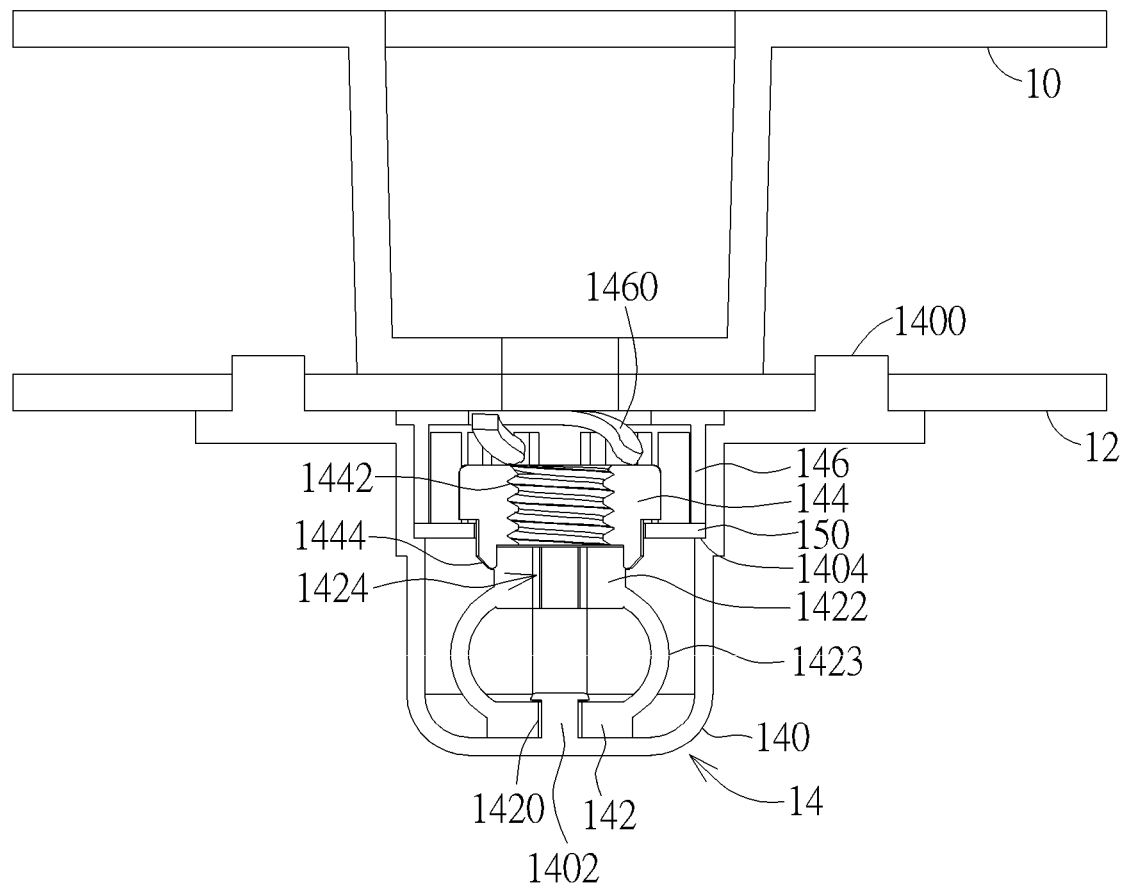
FIG. 4 is a sectional view illustrating an assembly of the casing, the frame, the cover, the nut, the washer, the lock member and the housing.
Figure 5:
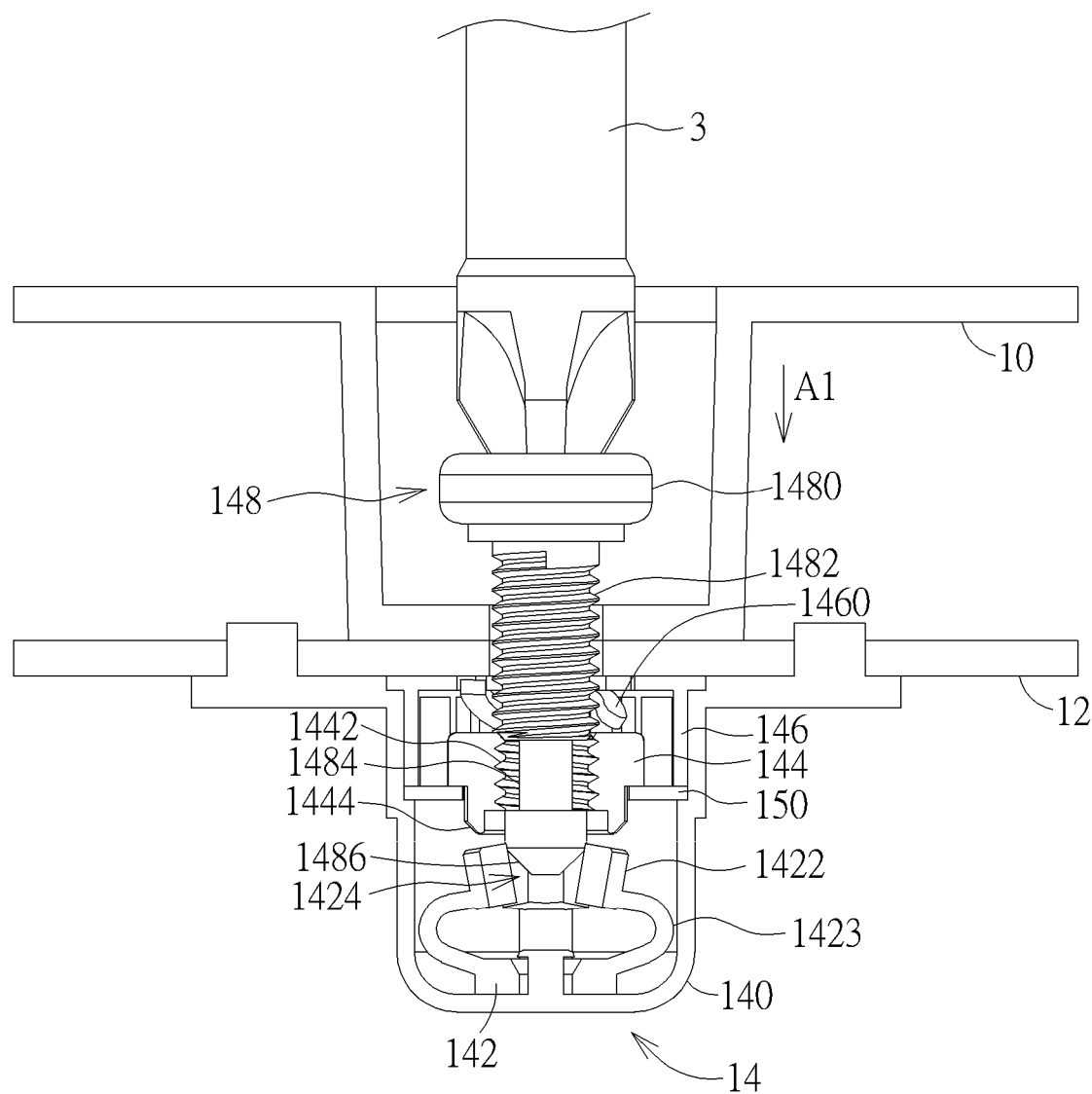
FIG. 5 is sectional view illustrating the tamper resistant screw screwed into the casing by a common driver.
Figure 6:
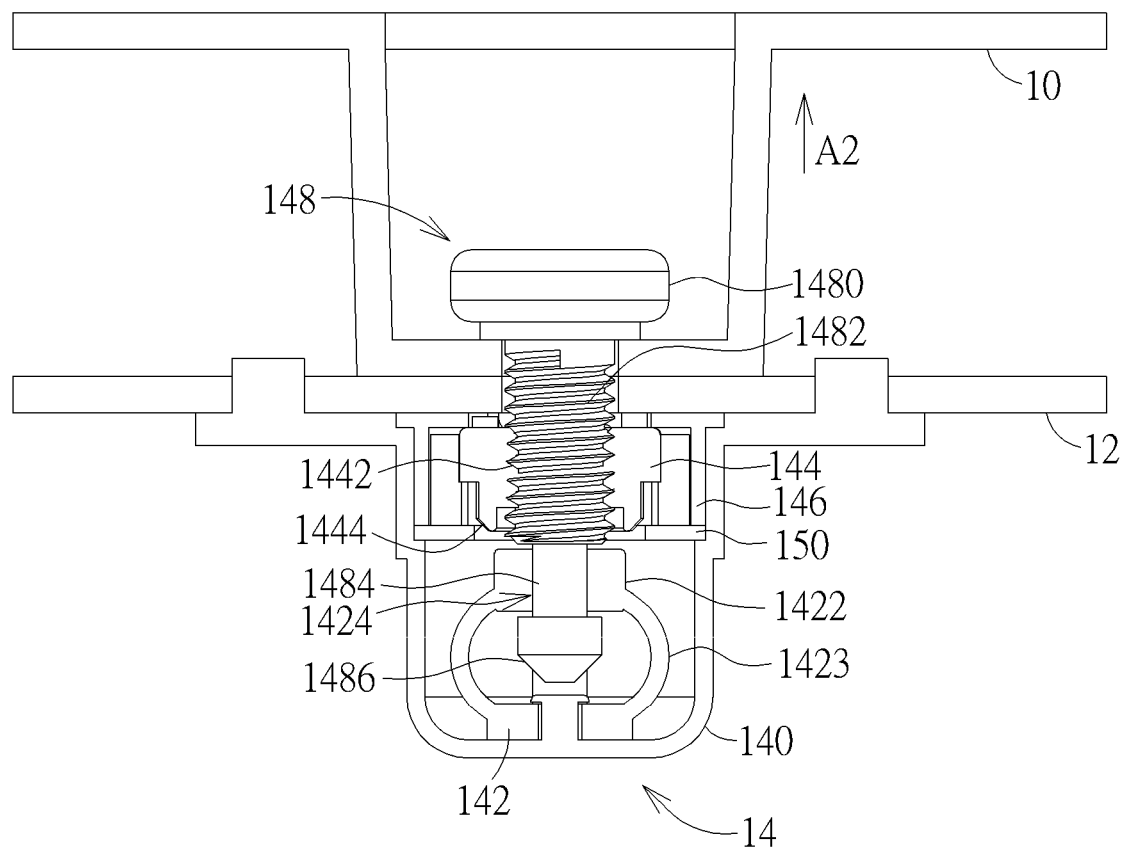
FIG. 6 is a sectional view illustrating the tamper resistant screw completely screwed into the casing.

Referring to FIGS. 1 to 6, FIG. 1 is a perspective view illustrating a tamper resistant system 1 according to an embodiment of the invention, FIG. 2 is an exploded view illustrating the casing 10, the frame 12 and the tamper resistant assembly 14, FIG. 3 is a perspective view illustrating the cover 146 from another viewing angle, FIG. 4 is a sectional view illustrating an assembly of the casing 10, the frame 12, the cover 146, the nut 144, the washer 150, the lock member 142 and the housing 140, FIG. 5 is sectional view illustrating the tamper resistant screw 148 screwed into the casing 10 by a common driver 3, and FIG. 6 is a sectional view illustrating the tamper resistant screw 148 completely screwed into the casing 10.

As shown in FIG. 1, the tamper resistant system 1 comprises a casing 10, a frame 12, a tamper resistant assembly 14 and a detaching tool 16. The frame 12 is disposed with respect to the casing 10. In practical applications, the casing 10 may be a part of a casing of any device with tamper resistant requirement and the frame 12 may be disposed in the casing 10. The tamper resistant means preventing unauthorized people from separating the casing 10 and the frame 12 by removing the tamper resistant screw 148.

As shown in FIGS. 2 to 6, the tamper resistant assembly 14 comprises a housing 140, a lock member 142, a nut 144, a cover 146, a tamper resistant screw 148 and a washer 150, wherein the lock member 142, the nut 144, the cover 146 and the washer 150 are disposed in the housing 140.

The housing 140 is fixed on the frame 12. In this embodiment, the frame 12 may have two fixing holes 120 and the housing 140 may have two fixing portions 1400, wherein the fixing portions 1400 may be fixed in the fixing holes 120, such that the housing 140 is fixed on the frame 12. In another embodiment, the fixing holes 120 may also be located on the housing 140 and the fixing portions 1400 may also be located on the frame 12. It should be noted that the number and the position of the fixing holes 120 and the fixing portions 1400 may be determined according to practical applications, so the invention is not limited to the embodiment shown in the figures.

In this embodiment, the lock member 142 may have a positioning hole 1420 and a bottom of the housing 140 may have a positioning portion 1402, wherein the positioning portion 1402 may be inserted into the positioning hole 1420, such that the lock member 142 is positioned in the housing 140, as shown in FIG. 4. In another embodiment, the positioning hole 1420 may also be located on the housing 140 and the positioning portion 1402 may also be located on the lock member 142. Furthermore, the lock member 142 comprises a plurality of locking blocks 1422 and a plurality of flexible arms 1423, wherein the locking blocks 1422 are located at the ends of the flexible arms, respectively, and a deformable opening 1424 is formed between the locking blocks 1422. In this embodiment, the lock member 142 may be made of plastic, such that the flexible arms 1423 have flexibility. It should be noted that the number of the locking blocks 1422 and the flexible arms 1423 may be determined according to practical applications, so the invention is not limited to the embodiment shown in the figures.

In this embodiment, the housing 140 may further comprise a positioning portion 1404, wherein the positioning portion 1404 may protrude from an inner wall of the housing 140. When the washer 150 is disposed in the housing 140, the washer 150 abuts against the positioning portion 1404. Furthermore, the cover 146 may comprise at least one elastic portion 1460. As shown in FIG. 3, the cover 146 may comprise three elastic portions 1460, wherein the elastic portions 1460 may be, but not limited to, elastic arms. As shown in FIG. 4, after the cover 146, the nut 144, the washer 150, the lock member 142 and the housing 140 are assembled, the nut 144 is located between the lock member 142 and the cover 146, and the cover 146 and the lock member 142 are located at opposite sides of the washer 150. Still further, after the housing 140 is fixed on the frame 12, the cover 146 abuts against the frame 12.

As shown in FIG. 2, the tamper resistant screw 148 comprises a head 1480, a thread 1482, a groove 1484 and a tip 1486, wherein the thread 1482 is located between the head portion 1480 and the groove 1484, and the groove 1484 located between the thread 1482 and the tip 1486. In this embodiment, the tip 1486 of the tamper resistant screw 148 may be cone-shaped. Furthermore, a hole of the head 1480 of the tamper resistant screw 148 for receiving a driver may be determined according to practical applications, so the invention is not limited to the embodiment shown in the figures.

The nut 144 has a thread portion 1442 and a sleeve portion 1444. The nut 144 is movable in the housing 140. Alone the axial direction of the tamper resistant screw 148, the nut 144 can be moved to the fastening side as shown FIG. 6 or the locking side as shown in FIG. 4. At the fastening side as shown FIG. 6, the thread portion 1442 of the nut 144 engages with the thread 1482 of the tamper resistant screw 148, and the nut 144 is driven by the thread 1482 of the tamper resistant screw 148 toward the direction of casing 10. The tamper resistant screw 148 and the nut 144 fasten the casing 10 and the frame 12 together. At the locking side as shown in FIG. 4, the nut 144 moves away from the casing 10, and the sleeve portion 1444 of the nut 144 sleeves the locking blocks 1422 of the lock member 142. For further illustration, the nut 144 is moved to the locking side, which the elastic portions 1460 of the cover 146 presses the nut 144 against the washer 150, and the sleeve portion 1444 of the nut 144 sleeves the locking blocks 1422 of the lock member 142.

As shown in FIG. 5, a user may use a common driver 3 to screw the tamper resistant screw 148 into the casing 10. When the tamper resistant screw 148 is being inserted, the tip 1486 of the tamper resistant screw 148 passes through the casing 10, the frame 12, the cover 146 and the nut 144 sequentially. Then, the tip 1486 of the tamper resistant screw 148 pushes the locking blocks 1422 of the lock member 142 out of the sleeve portion 1444 of the nut 144 towards a direction indicated by an arrow A1, so the locking blocks 1422 could be expanded outward freely. Furthermore, the thread 1482 of the tamper resistant screw 148 will contact the thread portion 1442 of the nut 144. Then, when the user rotates the common driver 3, the tip 1486 of the tamper resistant screw 148 is inserted into the expanded deformable opening 1424 and the nut 144 is driven by the thread 1482 of the tamper resistant screw 148 to move towards a direction indicated by an arrow A2 and compresses the elastic portions 1460 of the cover 146. Accordingly, as shown in FIG. 6, the nut 144 is moved to the fastening side and the tamper resistant screw 148 fixes the casing 10 and the frame 12 tightly. At the same time, the locking blocks 1422 of the lock member 142 retract inward (i.e. the deformable opening 1424 is reduced), such that the locking blocks 1422 of the lock member 142 engage with the groove 1484 of the tamper resistant screw 148. In other words, after the tip 1486 of the tamper resistant screw 148 is inserted into the deformable opening 1424, the locking blocks 1422 can engage around the groove 1484 of the tamper resistant screw 148.

Figure 7:
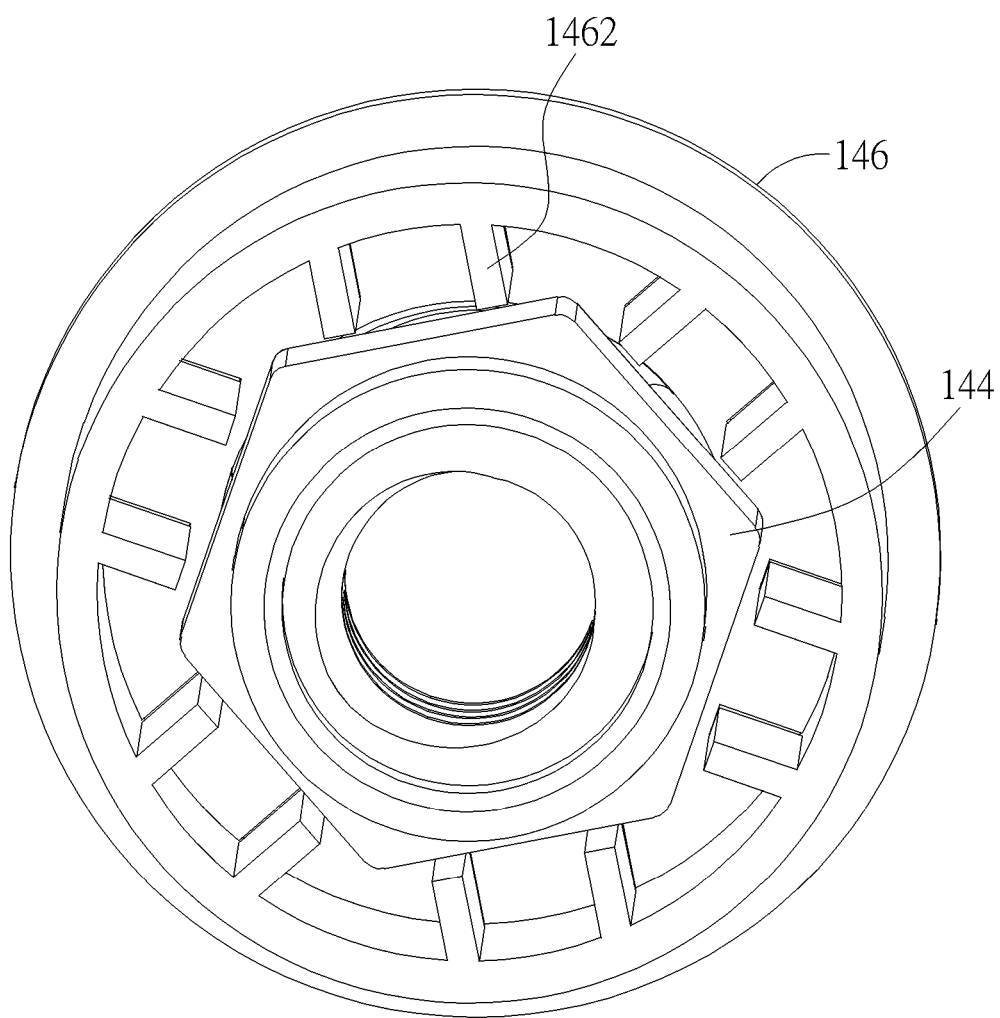
FIG. 7 is a perspective view illustrating an assembly of the nut and the cover from another viewing angle.

Referring to FIG. 7, FIG. 7 is a perspective view illustrating an assembly of the nut 144 and the cover 146 from another viewing angle.

As shown in FIG. 7, an inner wall of the cover 146 comprises at least one protruding portion 1462 and an outer wall of the nut 144 is polygonal (e.g. hexagonal). In this embodiment, the inner wall of the cover 146 may comprise a plurality of protruding portions 1462 arranged symmetrically. It should be noted that the number and the position of the protruding portions 1462 may be determined according to practical applications, so the invention is not limited to the embodiment shown in the figures. After the nut 144 and the cover 146 are assembled, the protruding portions 1462 may abut against the outer wall of the nut 144 to restrain the nut 144 from rotating. When the thread 1482 of the tamper resistant screw 148 drives the nut 144 to rotate with exceeding force, the protruding portions 1462 may be pushed by the outer wall of the nut 144 to deform elastically, such that the nut 144 can still rotate.

Figure 8:
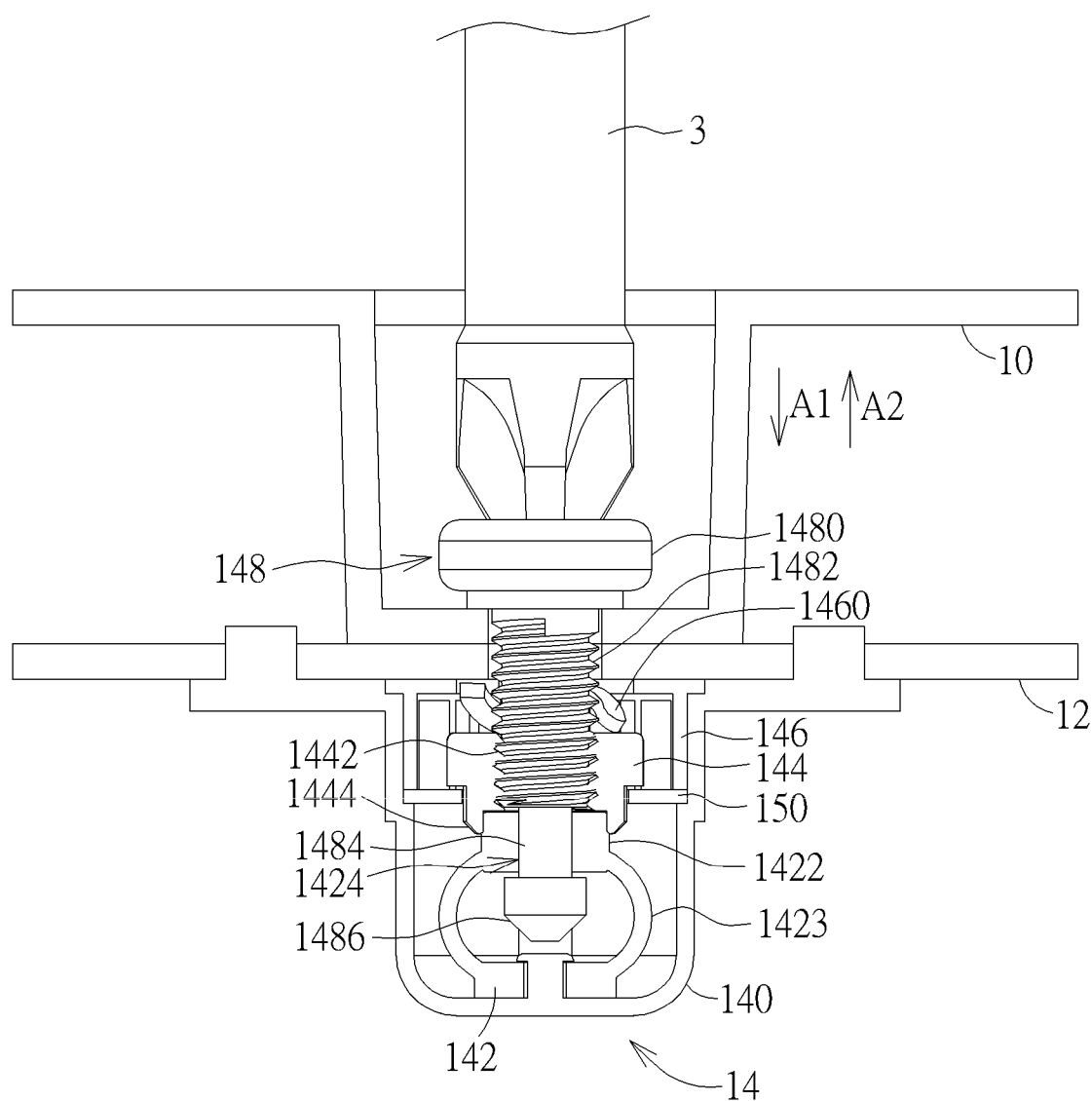
FIG. 8 is a sectional view illustrating the tamper resistant screw detached by the common driver.

Referring to FIG. 8, FIG. 8 is a sectional view illustrating the tamper resistant screw 148 detached by the common driver 3 and the nut 144 is moved to the locking side.

As shown in FIG. 8, when the unauthorized user attempts to use the common driver 3 to detach the tamper resistant screw 148, the user may use the common driver 3 to push the head 1480 of the tamper resistant screw 148 towards the direction indicated by the arrow A1. Then, the user rotates the common driver 3 to loose the tamper resistant screw 148. At this time, the tamper resistant screw 148 rotates without axial moving while the nut 144 is driven by the thread 1482 of the tamper resistant screw 148 to move towards the direction indicated by the arrow A1 until the sleeve portion 1444 of the nut 144 sleeves the locking blocks 1422 of the lock member 142. Accordingly, when the tamper resistant screw 148 was already inserted and the nut 144 is moved to the locking side by the rotation of the tamper resistant screw 148, the locking blocks 1422 of the lock member 142 engages around the groove 1484 of the tamper resistant screw 148 and is also sleeved by the sleeve portion 1444 of the nut 144. At this position, the locking blocks 1422 stop the nut 144 to separate from the tamper resistant screw 148. That means the casing 10 and the frame 12 cannot be disassembled. If the user keeps rotating the common driver 3, due to the engagement of the locking blocks 1422 and the groove 1484, the nut 144 could not move toward the direction indicated by the arrow A1 anymore but only rotates together with the tamper resistant screw 148. During rotation, the outer wall of the nut 144 keeps interfering with the protruding portions 1462 of the cover 146, such that the user gets wrong impression that the inner structure is broken and then stops detaching the tamper resistant screw 148. At this time, the user can still screw the tamper resistant screw 148 tightly again, such that the nut 144 moves to the fastening side shown in FIG. 6 towards the direction indicated by the arrow A2.

Figure 9:
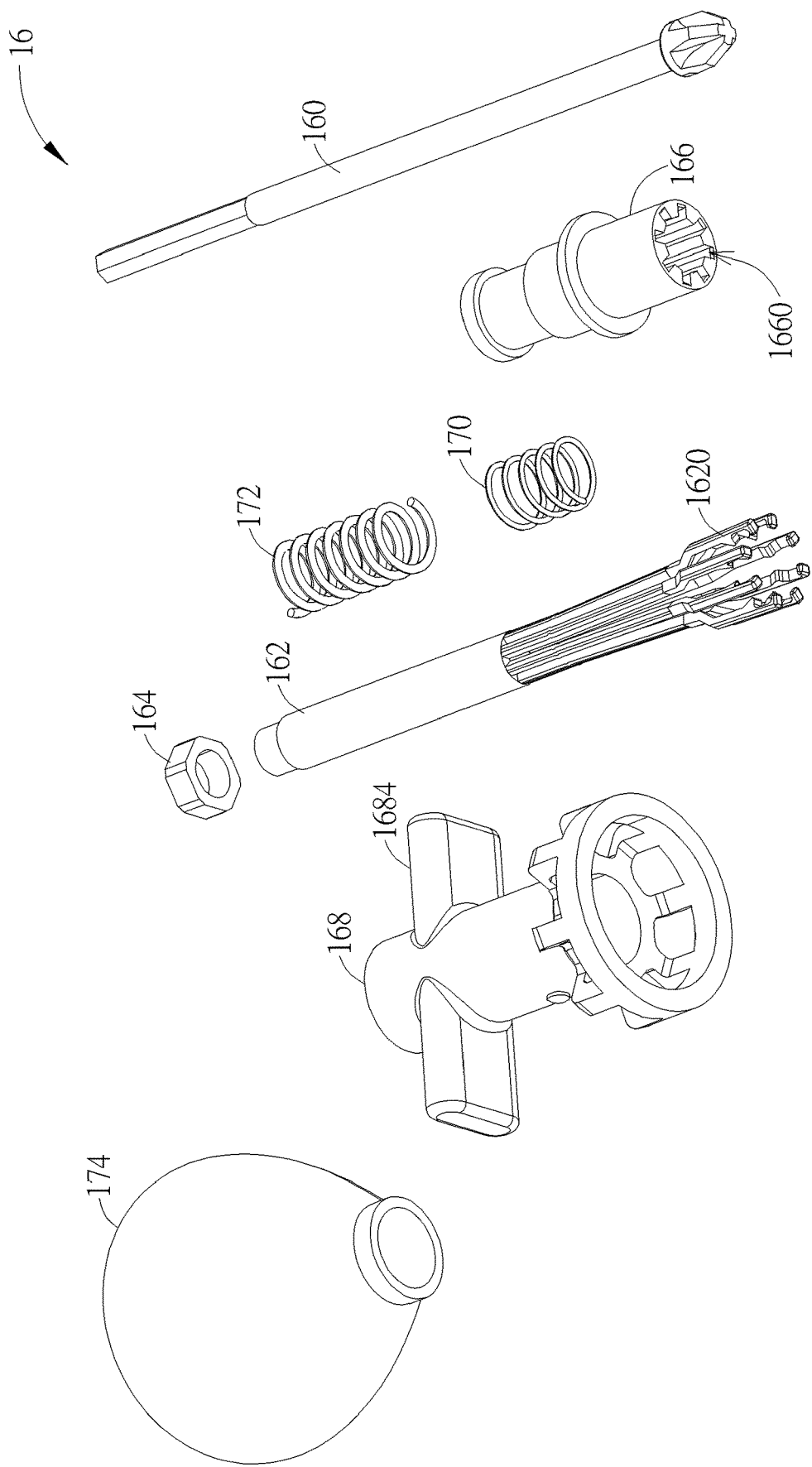
FIG. 9 is an exploded view illustrating the detaching tool.
Figure 10:
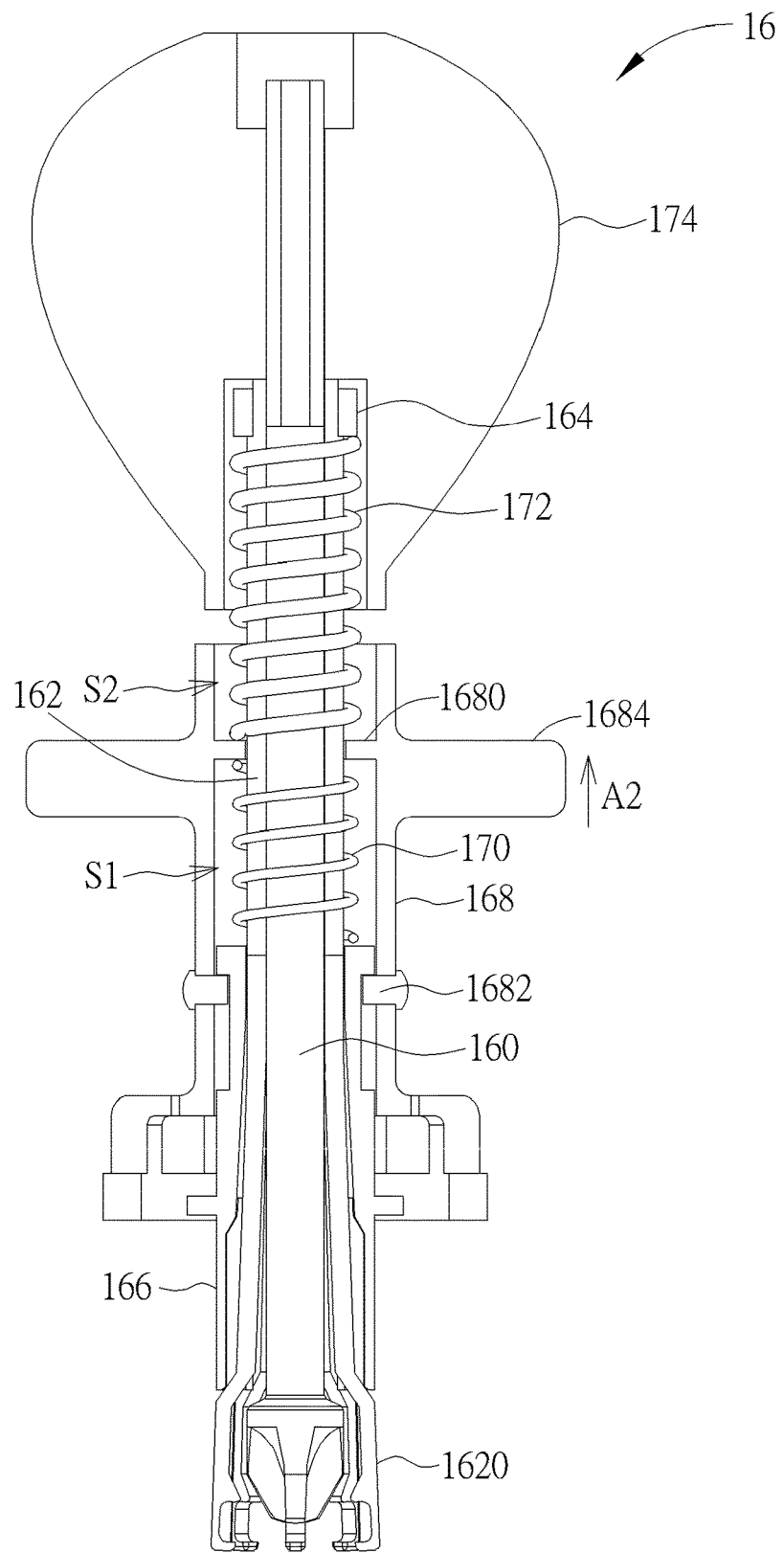
FIG. 10 is a sectional view illustrating the operating member pulled towards the fixing member.
Figure 11:
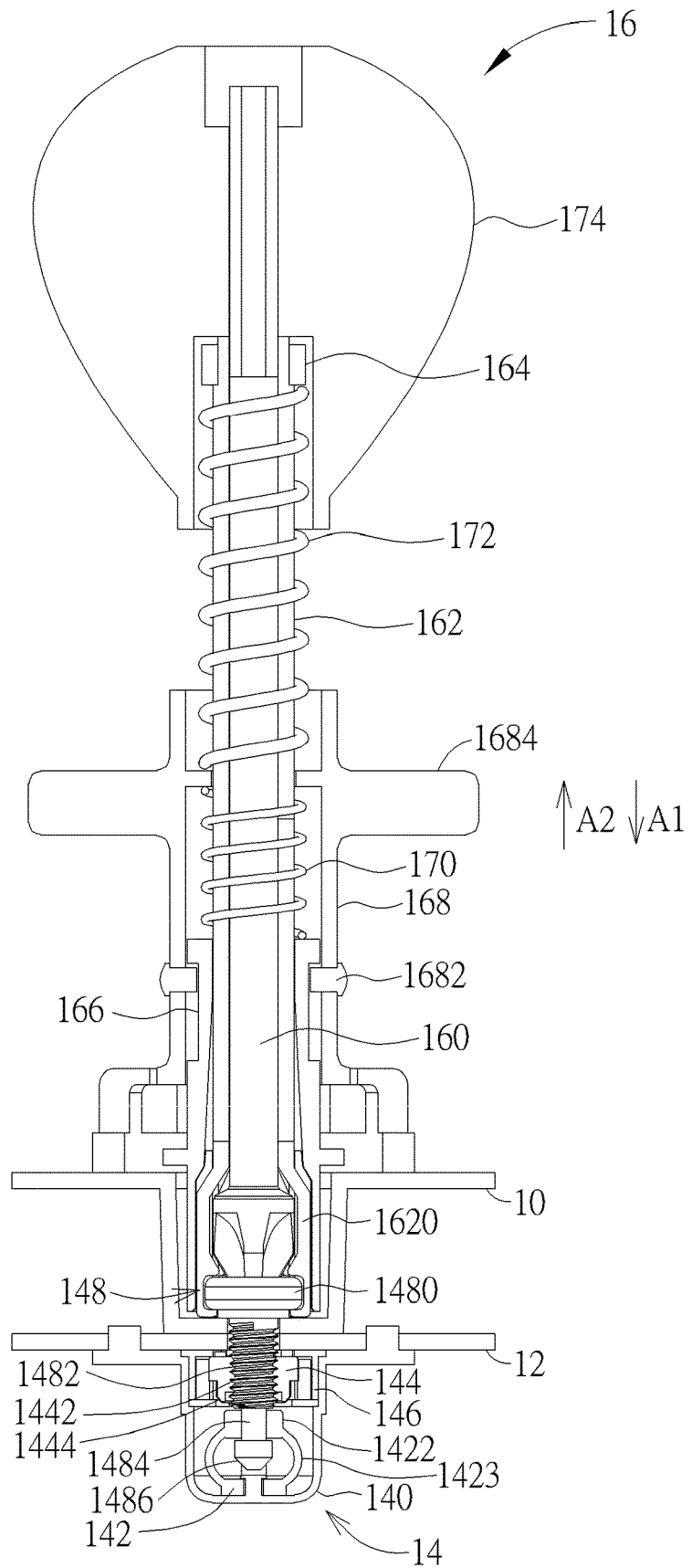
FIG. 11 is a sectional view illustrating that the movable hooks close to clamp the head of the tamper resistant screw.
Figure 12:
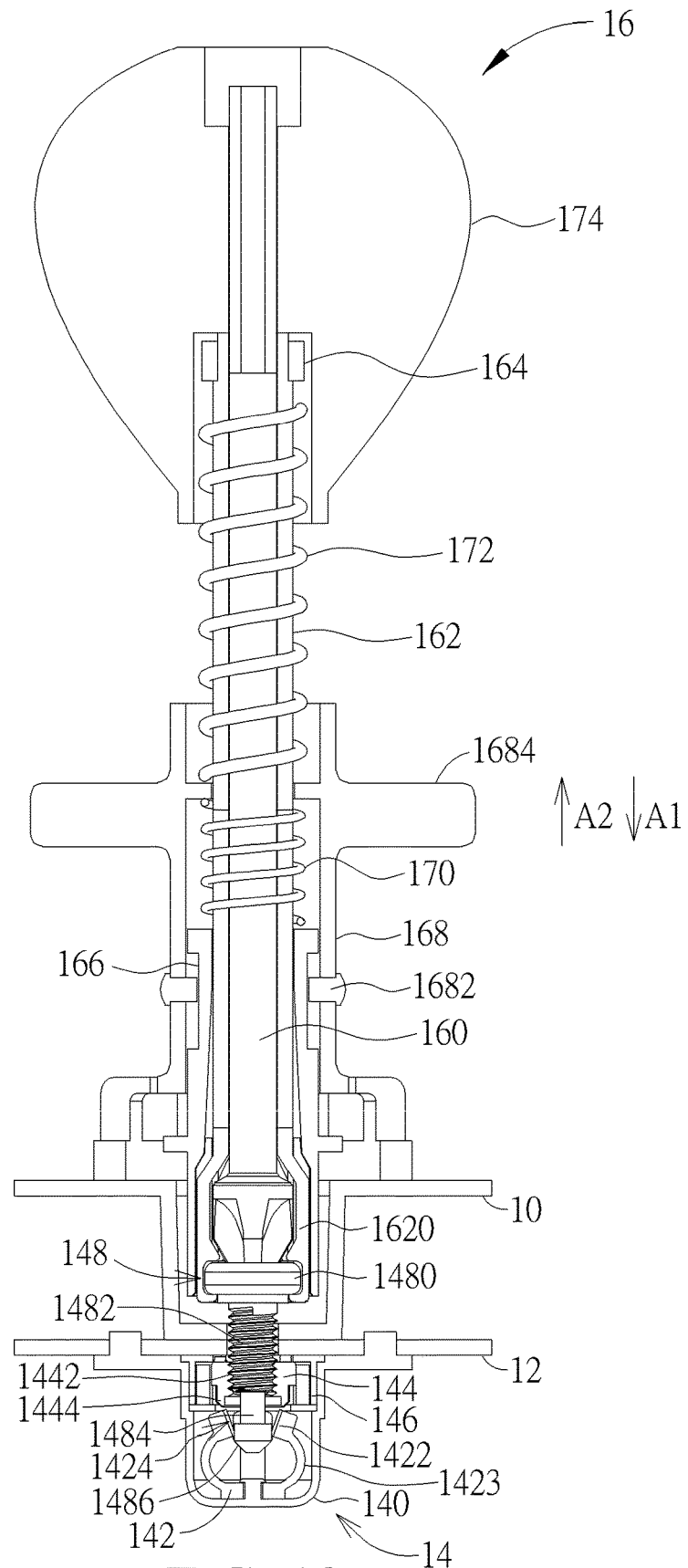
FIG. 12 is a sectional view illustrating the tamper resistant screw detached by the detaching tool.
Figure 13:
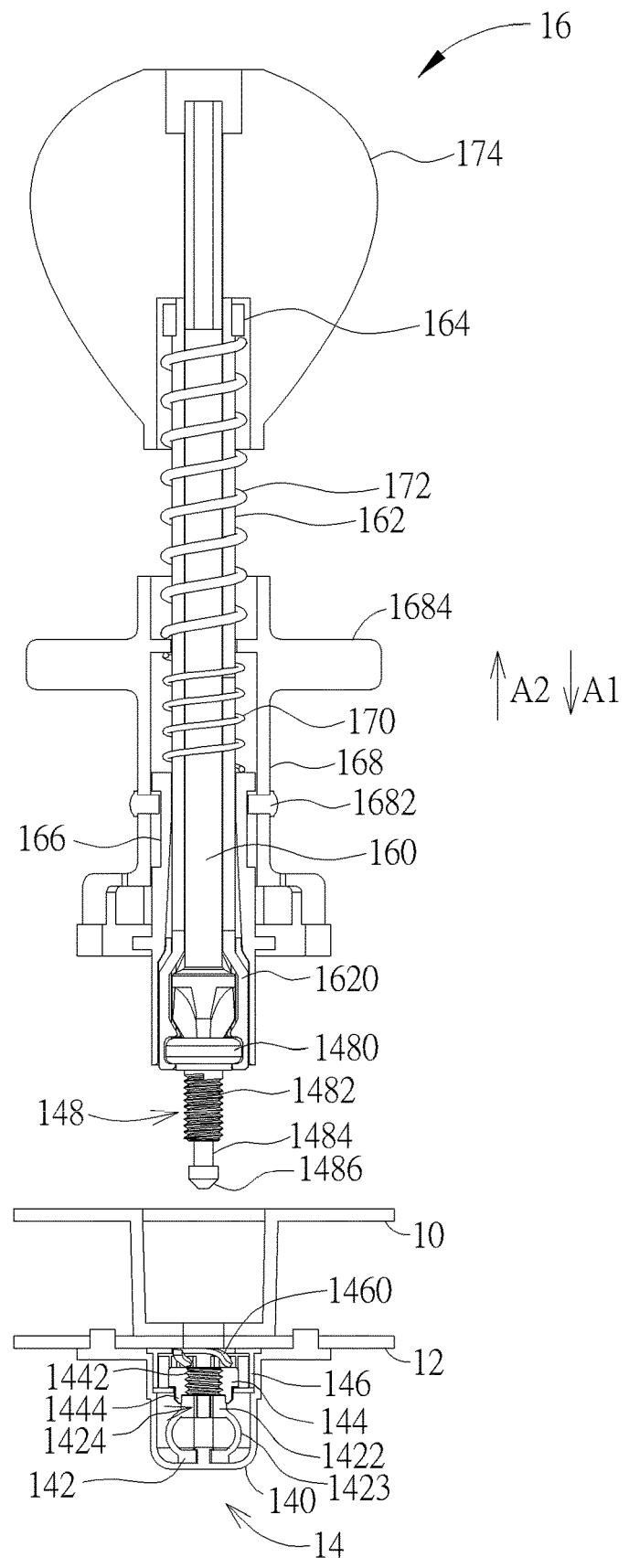
FIG. 13 is a sectional view illustrating the tamper resistant screw completely detached.

As shown in FIGS. 9 to 13, FIG. 9 is an exploded view illustrating the detaching tool 16, FIG. 10 is a sectional view illustrating the operating member 168 pulled towards the fixing member 164, FIG. 11 is a sectional view illustrating that the movable hooks 1620 close to clamp the head 1480 of the tamper resistant screw 148, FIG. 12 is a sectional view illustrating the tamper resistant screw 148 detached by the detaching tool 16, and FIG. 13 is a sectional view illustrating the tamper resistant screw 148 completely detached.

As shown in FIGS. 9 to 13, the detaching tool 16 comprises a driver 160, a clamping member 162, a fixing member 164, a sleeve 166, an operating member 168, a first elastic member 170, a second elastic member 172 and a holding member 174. The detaching tool 16 may be configured to detach the tamper resistant screw 148. Needless to say, the detaching tool 16 may also be configured to screw the tamper resistant screw 148 into the casing 10.

The clamping member 162 is disposed on the driver 160. The clamping member 162 comprises a plurality of movable hooks 1620. In this embodiment, the movable hooks 1620 may be cantilever structures and surround the driver 160. The fixing member 164 is fixed on an end of the clamping member 162 to fix the clamping member 162 on the driver 160 and keep the second elastic member 172 being disposed around the clamping member 162. In other words, the fixing member 164 fixes the second elastic member 172 on the clamping member 162. In this embodiment, the fixing member 164 may be, but not limited to, a nut. The sleeve 166 is disposed on the clamping member 162. As shown in FIG. 9, an interior of the sleeve 166 may have a plurality of grooves 1660 corresponding to the movable hooks 1620. When the sleeve 166 is disposed on the clamping member 162, the movable hooks 1620 are accommodated in the grooves 1660.

The operating member 168 is disposed on the clamping member 162 and the sleeve 166. As shown in FIG. 10, the operating member 168 has a partition portion 1680 and a restraining portion 1682, wherein the partition portion 1680 divides an interior of the operating member 168 into a first space S1 and a second space S2. The sleeve 166 is located in the first space S1 and the restraining portion 1682 restrains a moving range of the sleeve 166. In this embodiment, the partition portion 1680 may protrude from an inner wall of the operating member 168 and the restraining portion 1682 may be a rivet, a bolt, a screw or the like. The first elastic member 170 is disposed on the clamping member 162 and located in the first space S1, wherein opposite ends of the first elastic member 170 abut against the partition portion 1680 and the sleeve 166. The second elastic member 172 is disposed on the clamping member 162 and located in the second space S2, wherein opposite ends of the second elastic member 172 abut against the partition portion 1680 and the fixing member 164. In this embodiment, the first elastic member 170 and the second elastic member 172 may be, but not limited to, springs.

The holding member 174 is disposed on the driver 160. In this embodiment, the holding member 174 may cover the fixing member 164 and parts of the clamping member 162 and the second elastic member 172, but is not so limited. Furthermore, an exterior of the operating member 168 may have two handles 1684 opposite to each other.

When the user wants to detach the tamper resistant screw 148 by the detaching tool 16, the user may place the palm on the holding member 174 and pull the handles 1684 of the operating member 168 by fingers towards the fixing member 164 (i.e. the direction indicated by the arrow A2 shown in FIG. 10). When the operating member 168 is pulled towards the fixing member 164, the restraining portion 1682 of the operating member 168 drives the sleeve 166 to move away from the movable hooks 1620 of the clamping member 162, such that the movable hooks 1620 open and the second elastic member 172 is compressed.

Then, the user may operate the driver 160 to abut against the head 1480 of the tamper resistant screw 148 and release the handles 1684 of the operating member 168. As shown in FIG. 11, when the driver 160 abuts against the head 1480 of the tamper resistant screw 148 and the operating member 168 is released, an elastic force generated by the second elastic member 172 drives the operating member 168 and the sleeve 166 to move towards the movable hooks 1620 (i.e. the direction indicated by the arrow A1 shown in FIG. 11), such that the movable hooks 1620 close to clamp the head 1480 of the tamper resistant screw 148 and a front end of the operating member 168 abuts against a surface of the casing 10. At this time, the elastic force generated by the second elastic member 172 pulls the clamping member 162 towards the direction indicated by the arrow A2 and pushes the operating member 168 towards the direction indicated by the arrow A1 simultaneously, such that the movable hooks 1620 keep pulling the head 1480 of the tamper resistant screw 148 towards the direction indicated by the arrow A2.

Then, the user may rotate the holding member 174 to drive the driver 160 to rotate. When the driver 160 rotates to detach the tamper resistant screw 148, the tip 1486 of the tamper resistant screw 148 pushes the locking blocks 1422 of the lock member 142 outward and then is separated from the deformable opening 1424, as shown in FIG. 12. At this time, since the movable hooks 1620 keep applying a force of pulling out the head 1480 of the tamper resistant screw 148 towards the direction indicated by the arrow A2, the nut 144 keeps abutting against the cover 146 without moving towards the direction indicated by the arrow A1. In other words, the nut 144 will not move to the locking side as shown in FIG. 8, so the locking blocks 1422 could open freely to release the tamper resistant screw 148, as shown in FIG. 12. Furthermore, when the tamper resistant screw 148 is being detached, the sleeve 166 moves together with the clamping member 162 towards the direction indicated by the arrow A2 to compress the first elastic member 170.

As shown in FIG. 13, when the tamper resistant screw 148 is completely detached, an elastic force generated by the elastic portions 1460 of the cover 146 pushes the nut 144 towards the direction indicated by the arrow A1, such that the sleeve portion 1444 of the nut 144 sleeves the locking blocks 1422 of the lock member 142. Then, the user may pull the handles 1684 of the operating member 168 towards the direction indicated by the arrow A2. The restraining portion 1682 of the operating member 168 pulls the sleeve 166 toward the direction indicated by the arrow A2. At this time, the movable hooks 1620 open, such that the tamper resistant screw 148 is released.

Figure 14:
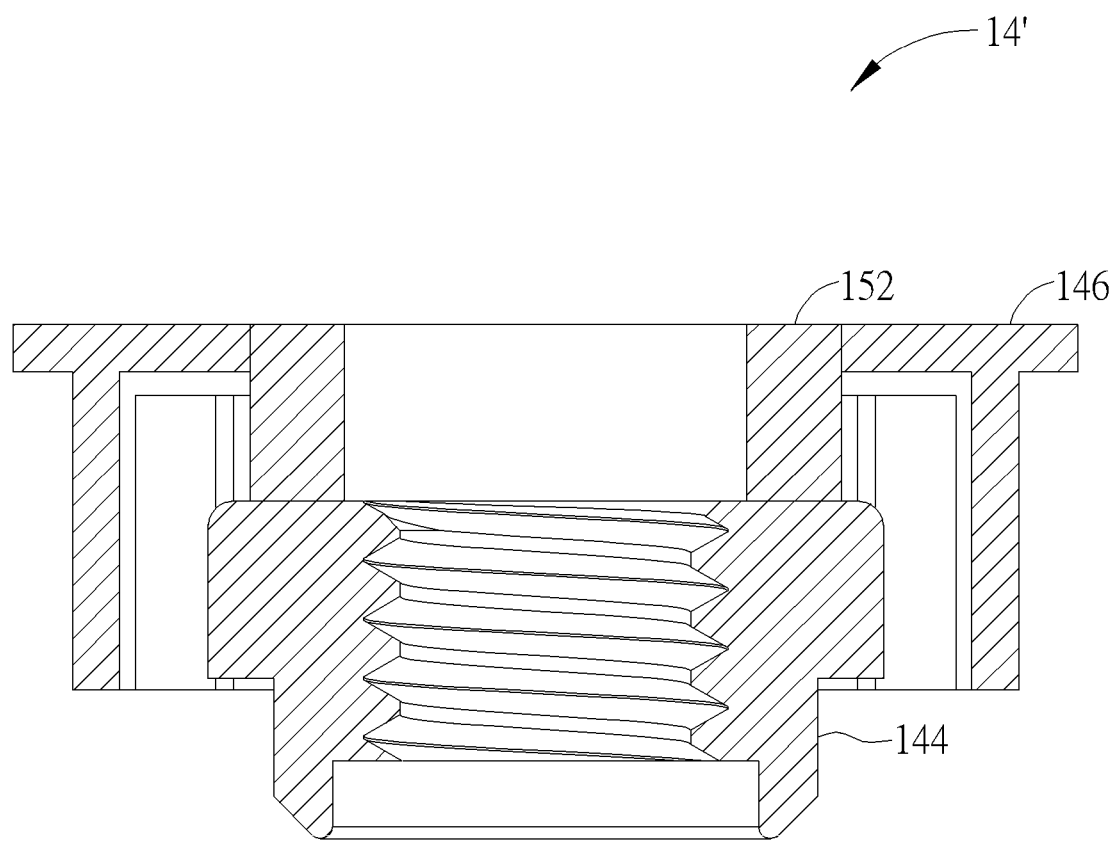
FIG. 14 is a sectional view illustrating a tamper resistant assembly according to another embodiment of the invention.

Referring to FIG. 14, FIG. 14 is a sectional view illustrating a tamper resistant assembly 14' according to another embodiment of the invention. The main difference between the tamper resistant assembly 14' and the aforesaid tamper resistant assembly 14 is that the tamper resistant assembly 14' further comprises an elastic body 152, wherein the elastic body 152 is disposed in the cover 146 and abuts against the nut 144, as shown in FIG. 14. In other words, the tamper resistant assembly 14' replaces the aforesaid elastic portions 1460 by the elastic body 152, wherein the principle of the elastic body 152 is identical to the principle of the elastic portions 1460, so the repeated explanation will not be depicted herein again. In this embodiment, the elastic body 152 may be a rubber gasket or the like. It should be noted that in addition to the nut 144, the cover 146 and the elastic body 152 shown in FIG. 14, the tamper resistant assembly 14' may also comprise the housing 140, the lock member 142, the tamper resistant screw 148 and the washer 150 mentioned in the above and the repeated explanation will not be depicted herein again.

Figure 15:
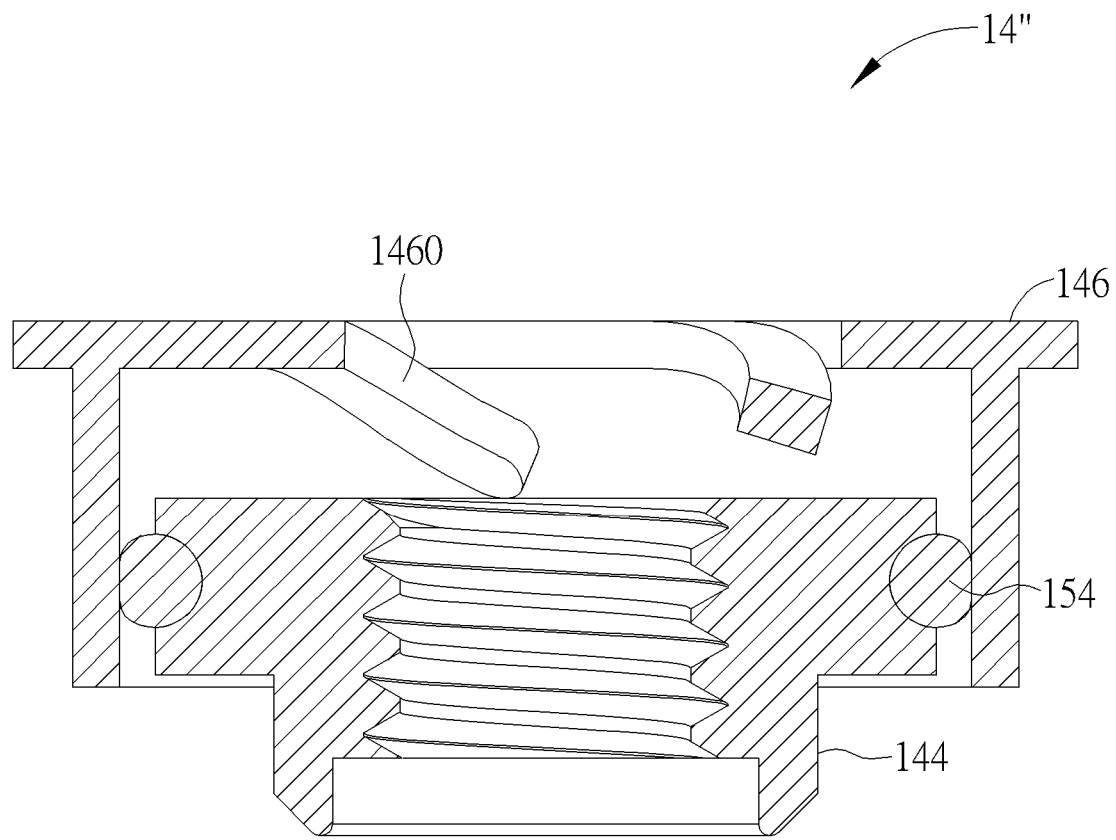
FIG. 15 is a sectional view illustrating a tamper resistant assembly according to another embodiment of the invention.

Referring to FIG. 15, FIG. 15 is a sectional view illustrating a tamper resistant assembly 14" according to another embodiment of the invention. The main difference between the tamper resistant assembly 14" and the aforesaid tamper resistant assembly 14 is that the tamper resistant assembly 14" further comprises an O-ring 154, wherein the O-ring 154 is disposed on an outer wall of the nut 144 and abuts against an inner wall of the cover 146, as shown in FIG. 15. Furthermore, the inner wall of the cover 146 does not comprise the aforesaid protruding portions 1462. In this embodiment, the invention uses the friction between the O-ring 154 and the inner wall of the cover 146 to restrain the nut 144 from rotating. In other words, the tamper resistant assembly 14" replaces the aforesaid protruding portions 1462 by the O-ring 154 to restrain the nut 144 from rotating. At this time, the outer wall of the nut 144 may be polygonal or circular according to practical applications. It should be noted that in addition to the nut 144, the cover 146 and the O-ring 154 shown in FIG. 15, the tamper resistant assembly 14" may also comprise the housing 140, the lock member 142, the tamper resistant screw 148 and the washer 150 mentioned in the above and the repeated explanation will not be depicted herein again.

Figure 16:
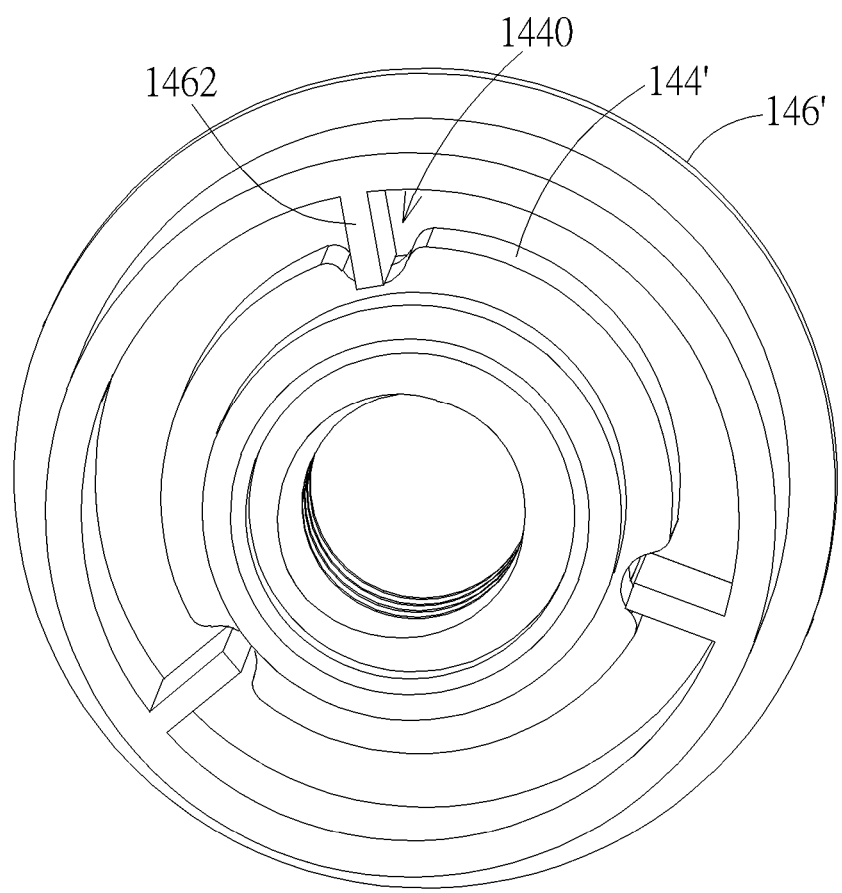
FIG. 16 is an assembly view illustrating a cover and a nut according to another embodiment of the invention.

Referring to FIG. 16, FIG. 16 is an assembly view illustrating a cover 146' and a nut 144' according to another embodiment of the invention. As shown in FIG. 16, an inner wall of the cover 146' may comprise at least one protruding portion 1462 and an outer wall of the nut 144' may comprise at least one recess 1440. In this embodiment, the inner wall of the cover 146' may comprise three protruding portions 1462 and the outer wall of the nut 144' may comprise three recesses 1440 correspondingly. It should be noted that the number and the position of the protruding portions 1462 and the recesses 1440 may be determined according to practical applications, so the invention is not limited to the embodiment shown in the figure. After the nut 144' and the cover 146' are assembled, the protruding portions 1462 engage with the recesses 1440 to restrain the nut 144' from rotating. When the thread 1482 of the tamper resistant screw 148 mentioned in the above drives the nut 144' to rotate, the protruding portions 1462 may be pushed by the side walls of the recesses 1440 to deform elastically, such that the nut 144' can still rotate. During rotation, the recesses 1440 of the nut 144' keep interfering with the protruding portions 1462 of the cover 146', such that the user gets wrong impression that the inner structure is broken and then stops detaching the tamper resistant screw 148. Accordingly, the invention may replace the nut 144 and the cover 146 mentioned in the above by the nut 144' and the cover 146' shown in FIG. 16.

Figure 17:
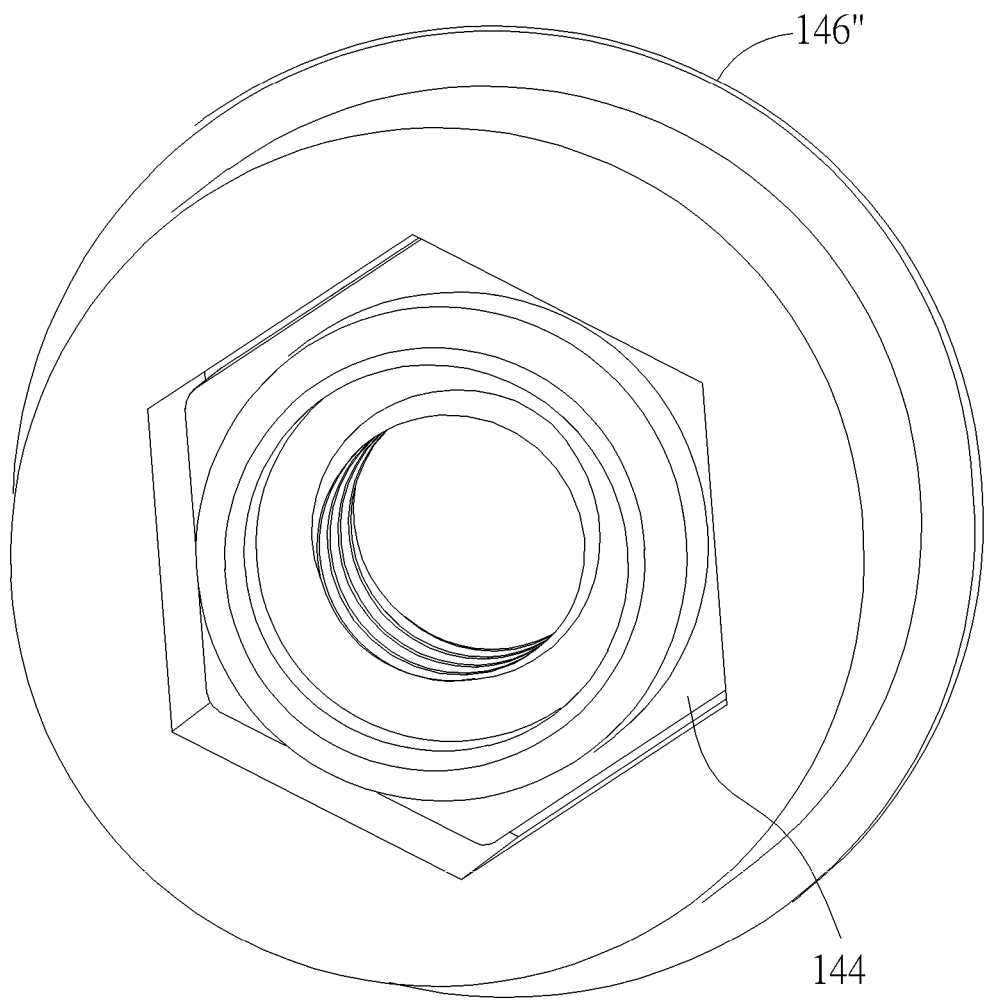
FIG. 17 is an assembly view illustrating a cover and the nut according to another embodiment of the invention.

Referring to FIG. 17, FIG. 17 is an assembly view illustrating a cover 146" and the nut 144 according to another embodiment of the invention. As shown in FIG. 17, an inner wall of the cover 146" and an outer wall of the nut 144 are polygonal (e.g. hexagonal) and disposed with respect to each other to restrain the nut 144 from rotating. When the aforesaid cover 146 is replaced by the cover 146", the cover 146" is not fixed to the frame 12, the housing 140 and the washer 150. In other words, the cover 146" may be driven to rotate by an external force larger than the friction. Accordingly, when the nut 144 is moved to the locking side as shown in FIG. 8 and the thread 1482 of the tamper resistant screw 148 mentioned in the above keeps driving the nut 144 to rotate, the nut 144 will drive the cover 146" to rotate together against the friction, such that the user gets wrong impression that the inner structure is broken and then stops detaching the tamper resistant screw 148. Accordingly, the invention may replace the cover 146 mentioned in the above by the cover 146" shown in FIG. 17.

Figure 18:
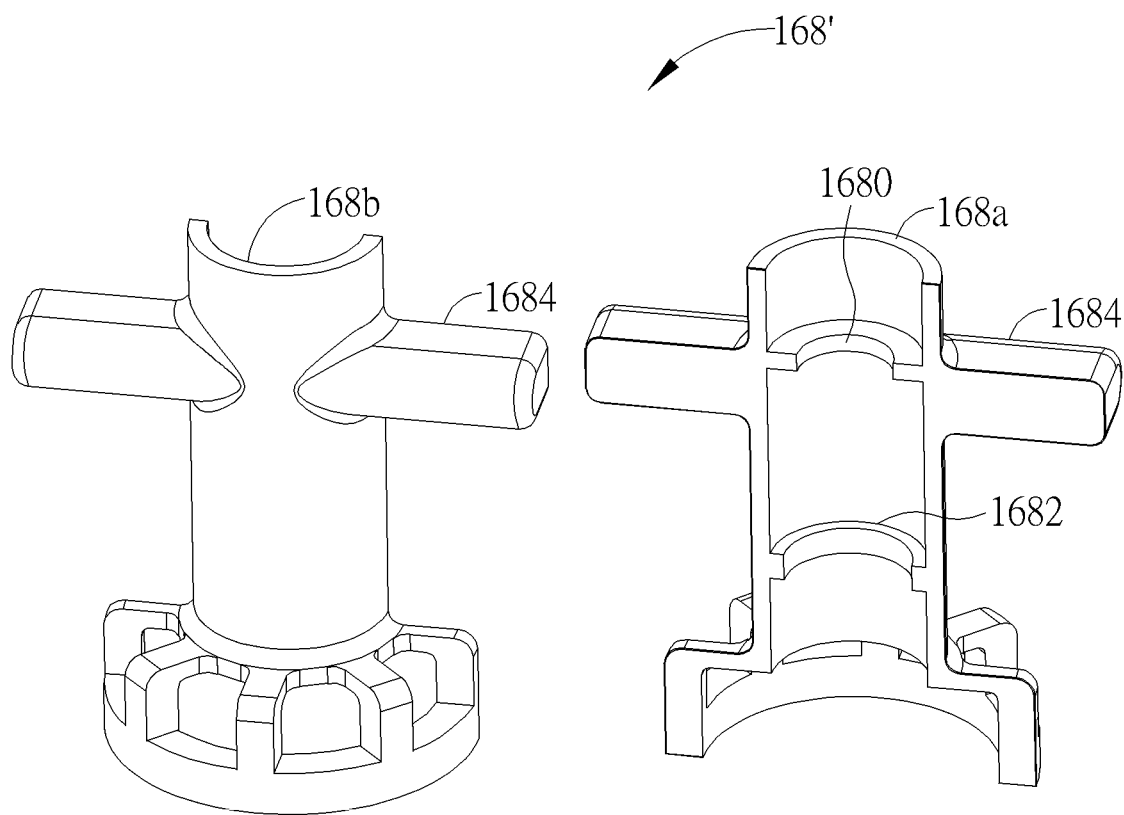
FIG. 18 is an exploded view illustrating an operating member according to another embodiment of the invention.

Referring to FIG. 18, FIG. 18 is an exploded view illustrating an operating member 168' according to another embodiment of the invention. The main difference between the operating member 168' and the aforesaid operating member 168 is that the operating member 168' comprises a first body 168a and a second body 168b, as shown in FIG. 18. In this embodiment, the first body 168a and the second body 168b may be connected to each other to form the operating member 168'. The connection between the first body 168a and the second body 168b may be implemented by engagement, screw, adhesion or other fixing manners according to practical applications. Furthermore, in this embodiment, the restraining portion 1682 may be integrally formed on inner walls of the first body 168a and the second body 168b.

As mentioned in the above, the tamper resistant assembly of the invention implements a tamper resistant function by the cooperation between the lock member, the nut, the cover and the tamper resistant screw. After the tamper resistant assembly is assembled, the tamper resistant screw cannot be detached by a common driver and it can be detached only by the detaching tool of the invention. In other words, if a person does not get the detaching tool of the invention, he/she cannot detach the casing equipped with the tamper resistant assembly of the invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A tamper resistant system comprising:
 a casing;
 a frame disposed with respect to the casing; and
 a tamper resistant assembly comprising:
  a tamper resistant screw comprising a head, a thread, a groove and a tip, the thread being located between the head portion and the groove, the groove being located between the thread and the tip;
  a housing fixed on the frame;
  a lock member disposed in the housing, the lock member comprising a plurality of locking blocks, a deformable opening being formed between the locking blocks;
  a nut disposed in the housing and covering the deformable opening; and
  a cover disposed in the housing and abutting against the frame, the nut being located between the lock member and the cover;
  wherein when the tip of the tamper resistant screw passes through the casing, the frame, the cover and the nut sequentially and enters the deformable opening, the nut is separated from the deformable opening and the locking blocks engage with the groove.

2. The tamper resistant system of claim 1, wherein the cover comprises at least one elastic portion and the at least one elastic portion abuts against the nut.

3. The tamper resistant system of claim 1, wherein the tamper resistant assembly further comprises an elastic body and the elastic body is disposed in the cover and abuts against the nut.

4. The tamper resistant system of claim 1, wherein an inner wall of the cover comprises at least one protruding portion, an outer wall of the nut is polygonal, and the at least one protruding portion abuts against the outer wall of the nut.

5. The tamper resistant system of claim 1, wherein an inner wall of the cover comprises at least one protruding portion, an outer wall of the nut comprises at least one recess, and the at least one protruding portion engages with the at least one recess.

6. The tamper resistant system of claim 1, wherein the tamper resistant assembly further comprises an O-ring and the O-ring is disposed on an outer wall of the nut and abuts against an inner wall of the cover.

7. The tamper resistant system of claim 1, wherein an inner wall of the cover and an outer wall of the nut are polygonal and disposed with respect to each other.

8. The tamper resistant system of claim 1, wherein the tamper resistant assembly further comprises a washer, the housing comprises a positioning portion, the washer is disposed in the housing and abuts against the positioning portion, the cover and the lock member are located at opposite sides of the washer, and the nut passes through the washer to cover the deformable opening.

9. The tamper resistant system of claim 1, further comprising:
 a detaching tool comprising:
  a driver;
  a clamping member disposed on the driver, the clamping member comprising a plurality of movable hooks;
  a fixing member fixing the clamping member on the driver;
  a sleeve disposed on the clamping member;
  an operating member disposed on the clamping member and the sleeve, the operating member having a partition portion and a restraining portion, the partition portion dividing an interior of the operating member into a first space and a second space, the sleeve being located in the first space, the restraining portion restraining a moving range of the sleeve;
  a first elastic member disposed on the clamping member and located in the first space, opposite ends of the first elastic member abutting against the partition portion and the sleeve; and a second elastic member disposed on the clamping member and located in the second space, opposite ends of the second elastic member abutting against the partition portion and the fixing member;

wherein when the operating member is pulled towards the fixing member, the operating member drives the sleeve to move away from the movable hooks, such that the movable hooks open and the second elastic member is compressed; when the driver abuts against the head of the tamper resistant screw and the operating member is released, an elastic force generated by the second elastic member drives the operating member and the sleeve to move towards the movable hooks, such that the movable hooks close to clamp the head of the tamper resistant screw; and when the driver rotates to detach the tamper resistant screw, the tip of the tamper resistant screw is separated from the deformable opening.

10. The tamper resistant system of claim 9, wherein the detaching tool further comprises a holding member and the holding member is disposed on the driver.

11. The tamper resistant system of claim 9, wherein the operating member comprises a first body and a second body, and the first body and the second body are connected to each other to form the operating member.

12. A tamper resistant assembly comprising:
a tamper resistant screw comprising a head, a thread, a groove and a tip, the thread being located between the head portion and the groove, the groove being located between the thread and the tip;
a housing fixed on the frame;
a lock member disposed in the housing, the lock member comprising a plurality of locking blocks, a deformable opening being formed between the locking blocks;
a nut disposed in the housing and covering the deformable opening; and
a cover disposed in the housing, the nut being located between the lock member and the cover;
wherein when the tip of the tamper resistant screw passes through the cover and the nut sequentially and enters the deformable opening, the nut is separated from the deformable opening and the locking blocks engage with the groove.

13. The tamper resistant assembly of claim 12, wherein the cover comprises at least one elastic portion and the at least one elastic portion abuts against the nut.

14. The tamper resistant assembly of claim 12, further comprising an elastic body, the elastic body being disposed in the cover and abutting against the nut.

15. The tamper resistant assembly of claim 12, wherein an inner wall of the cover comprises at least one protruding portion, an outer wall of the nut is polygonal, and the at least one protruding portion abuts against the outer wall of the nut.

16. The tamper resistant assembly of claim 12, wherein an inner wall of the cover comprises at least one protruding portion, an outer wall of the nut comprises at least one recess, and the at least one protruding portion engages with the at least one recess.

17. The tamper resistant assembly of claim 12, further comprising an O-ring, the O-ring being disposed on an outer wall of the nut and abutting against an inner wall of the cover.

18. The tamper resistant assembly of claim 12, wherein an inner wall of the cover and an outer wall of the nut are polygonal and disposed with respect to each other.

19. The tamper resistant assembly of claim 12, further comprising a washer, the housing comprising a positioning portion, the washer being disposed in the housing and abutting against the positioning portion, the cover and the lock member being located at opposite sides of the washer, the nut passing through the washer to cover the deformable opening.

20. A detaching tool comprising:
a driver;
a clamping member disposed on the driver, the clamping member comprising a plurality of movable hooks;
a fixing member fixing the clamping member on the driver;
a sleeve disposed on the clamping member;
an operating member disposed on the clamping member and the sleeve, the operating member having a partition portion and a restraining portion, the partition portion dividing an interior of the operating member into a first space and a second space, the sleeve being located in the first space, the restraining portion restraining a moving range of the sleeve;
a first elastic member disposed on the clamping member and located in the first space, opposite ends of the first elastic member abutting against the partition portion and the sleeve; and
a second elastic member disposed on the clamping member and located in the second space, opposite ends of the second elastic member abutting against the partition portion and the fixing member;
wherein when the operating member is pulled towards the fixing member, the operating member drives the sleeve to move away from the movable hooks, such that the movable hooks open and the second elastic member is compressed; and when the operating member is released, an elastic force generated by the second elastic member drives the operating member and the sleeve to move towards the movable hooks, such that the movable hooks close.

21. The detaching tool of claim 20, further comprising a holding member, the holding member being disposed on the driver.

22. The detaching tool of claim 20, wherein the operating member comprises a first body and a second body, and the first body and the second body are connected to each other to form the operating member.

* * * * *